United States Patent [19]

Magyar, Jr.

[11] 4,142,324
[45] Mar. 6, 1979

[54] PLANT POTTING SYSTEM
[76] Inventor: Don Magyar, Jr., 90 Garrish Ave., East Haven, Conn. 06512
[21] Appl. No.: 878,611
[22] Filed: Feb. 16, 1978

Related U.S. Application Data

[63] Continuation-in-part of Ser. No. 767,745, Feb. 11, 1977, abandoned.

[51] Int. Cl.² .............................................. A01C 11/00
[52] U.S. Cl. ............................................ 47/75; 47/78; 47/58
[58] Field of Search ................... 47/73, 75, 78, 74, 66, 47/48.5, 58

[56] References Cited
U.S. PATENT DOCUMENTS

| 2,514,269 | 7/1950 | Wilberschied | 47/81 |
|---|---|---|---|
| 2,741,875 | 4/1956 | Van Staalduinen | 47/75 |
| 3,362,105 | 1/1968 | Steiger | 47/73 |
| 3,804,311 | 4/1974 | Levey | 239/59 |
| 4,077,511 | 3/1978 | Mosijowsky | 47/48.5 X |

FOREIGN PATENT DOCUMENTS 100708  1/1965  Denmark ...................................... 47/66

*Primary Examiner*—Clifford D. Crowder
*Attorney, Agent, or Firm*—DeLio and Montgomery

[57] ABSTRACT

A plant potting system providing a pot to facilitate rapid and safe transplants of plants to a layer pot. The system includes a pot and liner rotatable with respect to each other, both the pot and liner have apertures formed therein in opposition when the pot and liner are in one position, and in alignment when they are in a second position rotated with respect to the first position to permit the plant roots to extend therethrough.

4 Claims, 3 Drawing Figures

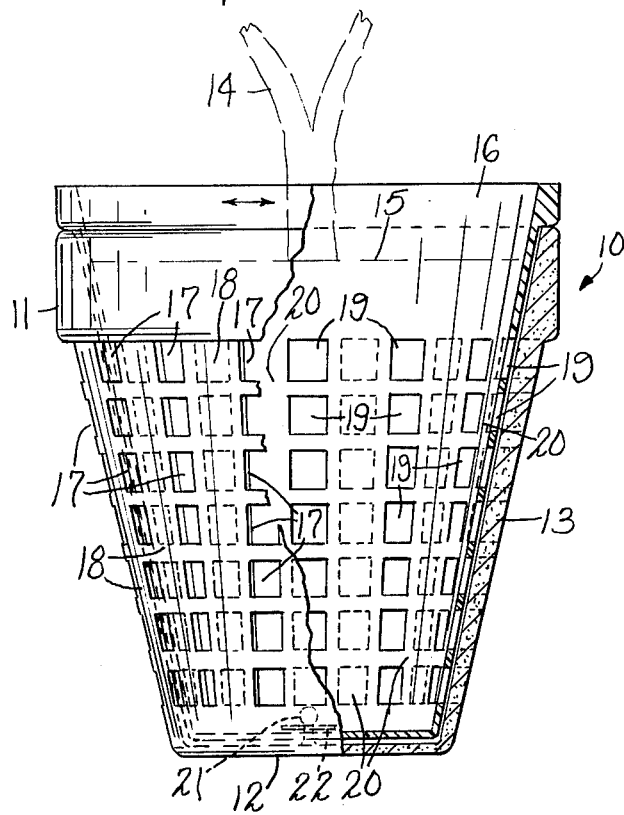
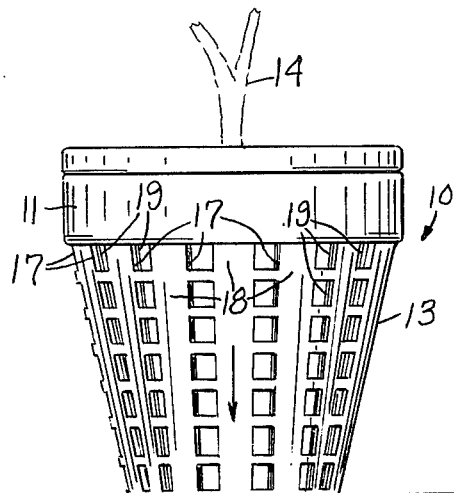
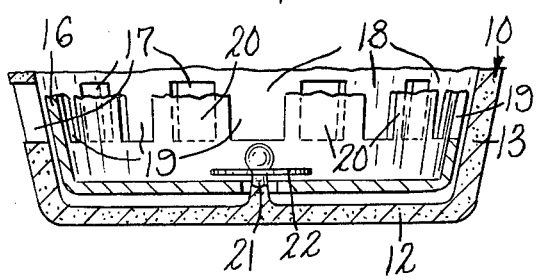
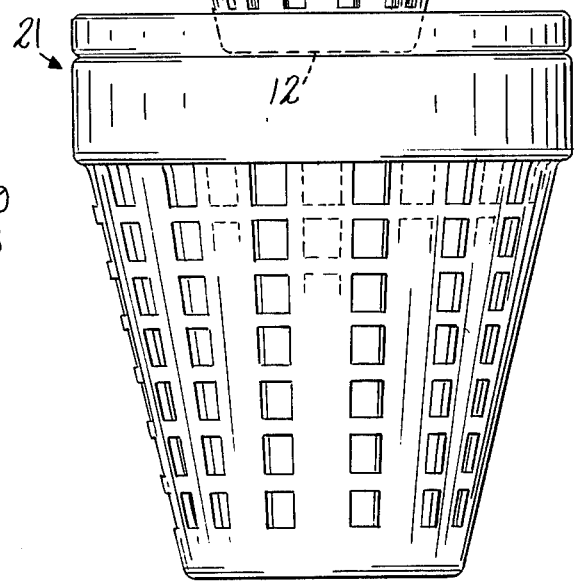

PLANT POTTING SYSTEM

This application is a continuation-in-part of application Ser. No. 767,745, filed Feb. 11, 1977, now abandoned.

The invention relates to apparatus for transplanting plants.

In recent years, as people have become more conscious of the environmental and aesthetic value of house plants, it has become desirable to include plants when decorating a home. Such plants are usually provided with a pot to hold the soil in which the plant is rooted. The pot is a receptacle for the dirt and serves to confine the roots of the plant.

As the plant grows larger, and its root system becomes more fully developed, it is usually desirable to transplant the growing plant to a larger container or to the outside soil to allow the root system to expand. Heretofore, the usual method of transplanting the plant has been to tip the plant and pot on its side and tap the pot until the soil loosens. The plant may then be removed by pulling it from the pot, along with any soil which may adhere to the roots that remain with the plant. This method of transplanting the growing plant has several serious drawbacks, however. Primary among these is that some of the roots may be broken off by the force of pulling the plant out of the pot. Furthermore, exposing the roots to the air may damage the surface of the roots, drying them out and making them brittle, before they may be repotted in the larger pot.

Of particular importance to the root system of the plant are thousands of small hair-like tendrils that extend from the main arteries of the roots. These tendrils are extremely delicate and are easily damaged by the repotting operation. When transplanting a plant, hundreds of these tendrils may be broken, which can set back development of the plant and its health and beauty. Indeed, on many occasions, the root system may be so damaged that the plant may not recover from the repotting.

It is also known to provide a removable perforated liner for the pot, which can be withdrawn from the pot, carrying the plant and soil. However, during the process the liner can deform, causing the soil to shift and severing the roots.

It is therefore an object of this invention to provide a new and improved apparatus for transplanting plants from one pot to another pot or to the outside ground.

It is another object to provide a new and improved apparatus for transplanting a plant from a pot without disturbing the root system of the plant.

In brief summary, the invention provides a pot having a shell and a liner both having a plurality of alignable apertures formed therein. The shell and liner are rotatable relative to each other. In one position, the apertures in the liner and shell are sealed by the lands in the other; and in a second position, the apertures in the shell and liner line up and allow the plant's roots to extend therethrough.

The features of the invention which are believed to be novel are particularly pointed out and distinctly claimed in the concluding portion of the specification. However, the invention both as to its organization and operation, together with any further objects and advantages thereof, may best be appreciated by reference to the following detailed description taken in conjunction with the drawings in which:

FIG. 1 is a side elevational view of a pot according to the invention;

FIG. 2 is a sectional view detail of the lower portion of the pot shown in FIG. 1; and FIG. 3 is a pot according to the invention containing a plant, juxtaposed a larger pot into which it is to be deposited.

With reference to FIG. 1, a pot 10 has a rim 11, a base 12, and a tapering side wall 13. Pot 10 preferably tapers from rim 11 towards base 12 and is cylindrical. The pot 10 provides a vessel for holding a plant 14, and soil 15 therefor (shown in phantom lines in FIG. 1).

Pot 10 further includes a webbed mesh one piece liner 16 shaped to fit inside of pot 10 and line the inside wall and bottom surfaces thereof. Liner 16 further extends a short distance above rim 11 and extends outwardly above pot 10 to be flush with rim 11.

A plurality of apertures 17, separated by lands 18, are formed in sidewall 13 of pot 10. A plurality of apertures 19, alignable with apertures 17, are formed in liner 16, separated by lands 20.

As exemplified in FIG. 2, liner 16 is retained in pot 10 by means of a stud 21 projecting from the center of base 12 through a centrally located aperture in the base of the liner 16. A retainer ring 22 snaps around stud 21 to prevent liner 16 from being withdrawn from pot 10.

Apertures 17 in pot 10, and apertures 19 in liner 16, are both of the size and spacing so that when the liner is rotated in one (closed) position, the apertures 17 are blocked by lands 20 in liner 16, and apertures 19 are blocked by the lands 18 of side wall 13. In this position, the apertures are sealed to prevent fluid communication between the inside and outside of pot 10.

In a second position of liner 16 with respect to pot 10, apertures 17 and 19 line up, allowing communication between the inside and outside of pot 10.

Preferably, pot 10 and liner 16 are symmetric about their axes of rotation to permit the liner to rotate without obstruction in pot 10.

In use, the liner is rotated to the first position, with the respective apertures in relative non-communication to seal the pot. The pot is then filled with dirt and the plant is planted in the pot 10. When it is deemed necessary to transplant the plant, the liner and pot are rotated relative to each other to line up apertures 17 and 19, as shown in FIG. 3, the plant and pot as a whole are deposited in a larger pot 21. The apertures 17 and 19 permit the roots of the plant 14 to extend therethrough into soil in pot 21.

As plant 14 grows, the plant may be planted in successively larger pots similar to pot 10.

Bottom 12 of pot 10 and the bottom of liner 16 may both be provided with apertures which are always aligned with apertures in the other to permit water seepage from the pot.

The particular retaining arrangement shown is by way of example and not limitation. For example, a resilient cap may be inserted over stud 21 in place of retaining ring 22. Alternatively, stud 21 may be topped with a horizontally-extending member (not shown) adapted to fit through a slit in the bottom of the liner. When the liner is rotated so that the member and slit are not in alignment, the liner is held in by the member.

The apertures 17 and 19 may have any shape, such as circular or triangular or the like. Showing apertures 17 and 19 in rectangular form is by way of example only.

It may thus be seen that the objects of the invention set forth as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A plant potting system comprising a pot having a plurality of apertures in the sides and bottom thereof and a liner having a plurality of apertures in the sides and bottom thereof, said liner being rotatably secured to said pot, said pot side apertures and said liner side apertures being so situated as to be in non-communicating opposition when said pot and said liner are in one angular position relative to each other, and in communicating alignment when said liner and said pot is in a second angular position relative to each other, said pot bottom apertures and said liner bottom apertures being in communicating alignment in both said first position and said second position.

2. A system as defined in claim 1 further comprising means for rotatably securing said liner to said pot.

3. A system as defined in claim 2 wherein said securing means comprises a stud projecting from the center of the bottom of said pot through an aperture in the bottom of said liner and retaining means affixed to said stud preventing said liner from being removed from said stud.

4. A method of transplanting a plant comprising the steps of:
  (i) providing the plant with a first pot and liner therefor, said liner being rotatable in said pot, said pot and liner both having a plurality of apertures in the sides and bottom thereof, said pot side apertures being so situated as to be in non-communicating opposition with said liner side apertures when said pot and said liner are in one angular position relative to each other, and in communicating alignment when said pot and said liner are in a second angular position relative to each other, said pot bottom aperture and said liner bottom apertures being in communicating alignment in both said first position and said second position, said pot and liner initially being in said first angular position;
  (ii) providing a second pot for receiving said first pot;
  (iii) rotating said first pot and liner to said second angular position to bring said respective side apertures into communicating alignment;
  (iv) inserting said first pot into said second pot; and
  (v) filling said second pot with soil.

* * * * *